United States Patent [19]
Dauerer et al.

[11] Patent Number: 5,841,435
[45] Date of Patent: Nov. 24, 1998

[54] VIRTUAL WINDOWS DESKTOP

[75] Inventors: Norman J. Dauerer, Hopewell Junction; Edward E. Kelley, Wappingers Falls; Franco Motika, Hopewell Junction, all of N.Y.

[73] Assignee: International Business Machines Corporation, Armonk, N.Y.

[21] Appl. No.: 686,835

[22] Filed: Jul. 26, 1996

[51] Int. Cl.$^6$ ..................................................... G06F 15/00
[52] U.S. Cl. ..................... 345/339; 345/329; 345/340; 345/348; 345/351
[58] Field of Search ..................................... 245/326, 329, 245/330, 331, 332, 339, 340, 342, 343, 344, 348, 345, 351

[56] References Cited

U.S. PATENT DOCUMENTS

| | | | |
|---|---|---|---|
| 5,107,443 | 4/1992 | Smith et al. | 345/331 |
| 5,463,726 | 10/1995 | Price | 345/342 |
| 5,499,334 | 3/1996 | Staab | 345/340 |
| 5,564,002 | 10/1996 | Brown | 345/340 |

*Primary Examiner*—Huynh Ba
*Attorney, Agent, or Firm*—DeLio & Peterson,LLC; Peter W. Peterson; Aziz M. Ahsan

[57] ABSTRACT

A process for a virtual windows desktop system visually organizing multiple computer application objects on a computer screen comprising the steps of: 1) providing for a virtual display with application objects arranged thereon and having a virtual area larger than the screen when the application objects are resolvable on the screen; 2) providing for a physical display for displaying the application objects; 3) locating the physical display at a position corresponding to at least one of the application objects on the virtual display; 4) viewing the application object through the physical display; and 5) moving the physical display or a larger group of application objects in one single, continuous movement or one discreet movement anywhere on the virtual display. The process extends the windows work area within the virtual display area, beyond the physical limitations of the system's display devices.

5 Claims, 17 Drawing Sheets

VIRTUAL WINDOWS DESKTOP

BACKGROUND OF THE INVENTION

1. Field of the Invention

The present invention pertains to computer graphics systems and more particularly to a graphical user interface (GUI) and the ability to concurrently run or simultaneously display multiple applications windows in optimum configuration.

2. Problem to be Solved

The interface between a computer, a user and a program application is the operating system. Examples of operating systems include Microsoft® MS-DOS®, Microsoft® Windows™ and IBM OS/2. An operating system performs basic tasks such as recognizing keyboard input, sending output to the screen, keeping track of files and directories and controlling peripheral devices such as printers, pointing devices and disk drives. A Windows type operating system, shown in FIG. 1, has many aspects; perhaps most predominantly a Windows type environment has a Graphical User's Interface (GUI). The GUI is the interface between the user and the computer which uses icons to represent applications and functions. The GUI environment provides a user with a way to visually organize applications in an environment which includes windows that open and close allowing the user to enter and exit applications.

In most of today's window management environments all application windows are displayed on a fixed display screen through the parameters of a video display terminal. The windows can be in a minimized icon form, maximized to a physical display size, or adjusted to a size specified by the user or corresponding application. Each of the windows in turn can be fully or partially displayed depending upon the location on the physical display and the positional and display priority relationship to other windows. The user, interfacing with an application, is frequently faced with the tedious task of locating and activating the desired windows and reconfiguring the display for effective operation.

Another limitation of current window management programs is encountered with applications that use multiple windows to support many functions simultaneously. As the user switches from one to another application, there is no easy way of grouping the associated windows from the activated applications. This problem is becoming increasingly severe as the complexity of newly developed applications expand and personal computer and workstation systems become more powerful. The basic problem extends across different operating systems such as IBM OS/2, Microsoft® Windows™, and Unix variations. The problem has not been solved in prior window management software packages.

Bearing in mind the problems and deficiencies of the prior art, it is therefore an object of the present invention to provide a graphical user interface adapted to operate in a plurality of operating systems and operate application programs therein.

It is another object of the present invention to provide a graphical user interface which provides the user with an easy and efficient way of locating and activating application windows.

A further object of the present invention to provide a window management software package which provides the user with an easy and efficient way of locating and activating application windows.

It is yet another object of the invention to provide a window management software package which provides the user with an easy and efficient way of organizing application windows.

It is yet another object of the present invention to provide a window management software package which provides the user with an easy and efficient way of viewing activated application windows.

Still other objects and advantages of the invention will in part be obvious and will in part be apparent from the specification.

SUMMARY OF THE INVENTION

The above and other objects, which will be apparent to those skilled in the art, are achieved by the present invention. A virtual windows desktop (VWD) system solves the window management problems described above. The VWD system extends the windows work area beyond the physical limitations of the system's display device or screen and provides tools to manage the physical display within the virtual display area. This VWD system can be configured to any desired size and dynamically modified by the user for the specific application need. Also, the VWD system is adapted to operate in a plurality of operating systems and operate application programs therein.

The larger virtual display area allows the user the freedom to spread out the windows beyond the physical display and group similar application windows in the same virtual display portion. In effect, the user has a large set of equally sized physical display portions that can be easily managed.

This environment is analogous to a real desk represented by the virtual display, while the desk pad is represented by the physical display. The management tools in turn allow the user to look at the contents of the whole desk and easily move any work onto or out of the desk pad or display without disturbing the rest of the work area.

The VWD system is divided into, but not limited to, three functional categories which include Virtual Display Function, Physical Display Function and Application Window Function categories. Display attributes including anchored object attribute, floating object attribute and associated object attribute, work with the functional categories in varying combinations.

The Virtual Display Functions provide the user with the capability to manage the virtual display. The virtual display can be configured to any size desired within the storage limitations of the system and could be multiple of the physical display or a variable size if preferred.

The Physical Display Functions provide the user with the capability to manage the physical display and any objects within it. Some of the functions have a similar function those of the virtual display mode, but are performed directly from the physical display environment.

The Application Window Functions provide the user with functions similar to those provided by the window management operating system. These functions are independent of the functions described and are not affected by them. The basic functions consist of sizing application windows such as minimizing, maximizing, and full screen display. Others may include moving, copying, opening, and closing application windows. The application functions form an integral part of the VWD system.

In a first aspect, the present invention relates to a process for visually organizing multiple computer application objects on a computer screen, adapted to execute a computer program with a graphical user interface. The process comprising the steps of: providing a virtual display adapted to display application objects arranged thereon, the virtual display having a virtual area larger than the screen when the application objects are resolvable on the screen; providing a physical display adapted to be displayed on the screen or a portion thereof for displaying the application objects; locating the physical display at a position corresponding to at least one of the application objects on the virtual display; and viewing the application object through the physical display.

Another aspect of the present invention relates to a graphical user interface for visually organizing multiple computer application objects, each of the application objects corresponding to a computer program to be executed. The graphical user interface comprises a virtual display adapted to display the application objects arranged thereon, the virtual display having a virtual area larger than the physical display when the application objects are resolvable on the screen; and a physical display adapted to be displayed on a computer screen or a portion thereof for displaying the application objects, the physical display being adapted to view at least one of the application objects on the virtual display. The graphical user interface adapted to operate in a plurality of operating systems and operate application programs therein.

In another aspect, the present invention relates to a graphical display system. The graphical display system comprises a computer system and a display screen, the display screen capable of displaying a graphical user interface system. The graphical user interface system comprises: a virtual display adapted to display the application objects arranged thereon, the virtual display having a virtual area larger than the physical display when the application objects are resolvable on the computer screen; and a physical display adapted to be displayed on the computer screen or a portion thereof for displaying the application objects, the physical display being adapted to view at least one of the application objects on the virtual display. The graphical user interface system adapted to operate in a plurality of operating systems and operate application programs therein.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
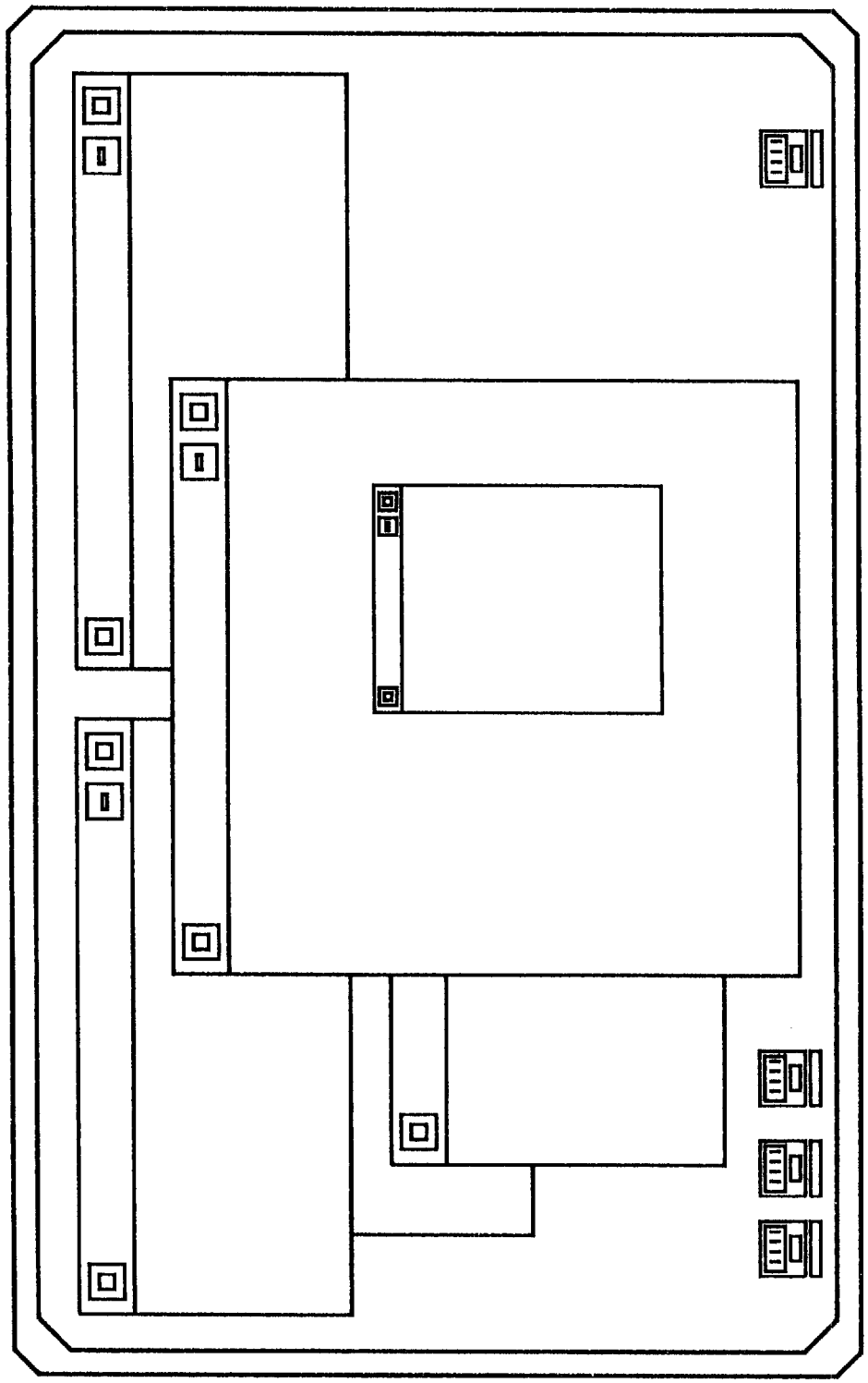
FIG. 1 is an exemplary view of a typical prior art window management operating system desktop display.

In describing the preferred embodiment of the present invention, reference will be made herein to FIGS. 2–17 of the drawings in which like numerals refer to like features of the invention. Features of the invention are not necessarily shown to scale in the drawings. Some functions described below are not illustrated with separate drawings because of their dynamic nature. However, these functions are represented in the flow chart of FIGS. 13–17. The object numbers assigned in the figures are carried through in each description for consistency.

Figure 2:
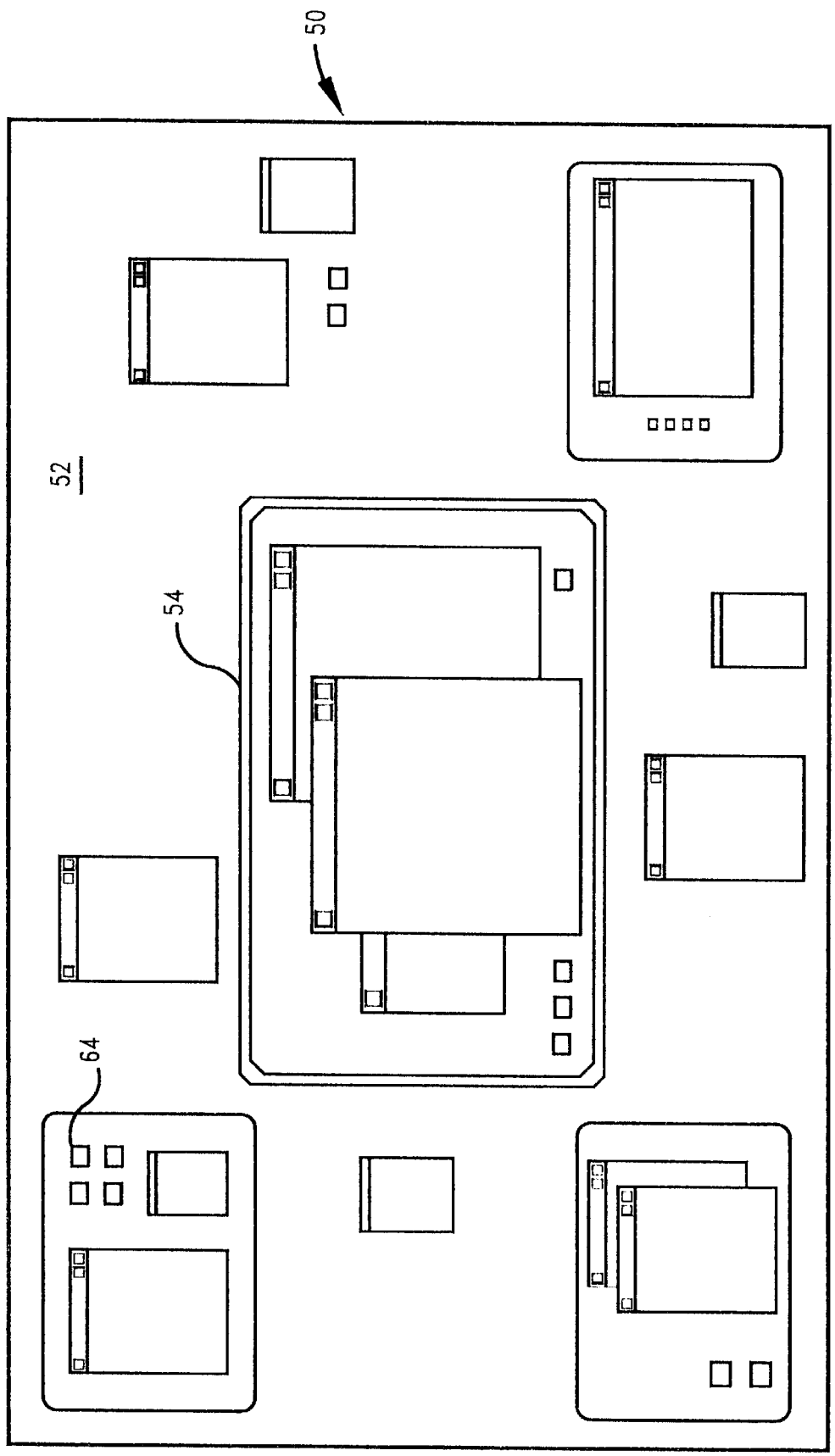
FIG. 2 is an exemplary view of the present invention virtual display.
Figure 3:
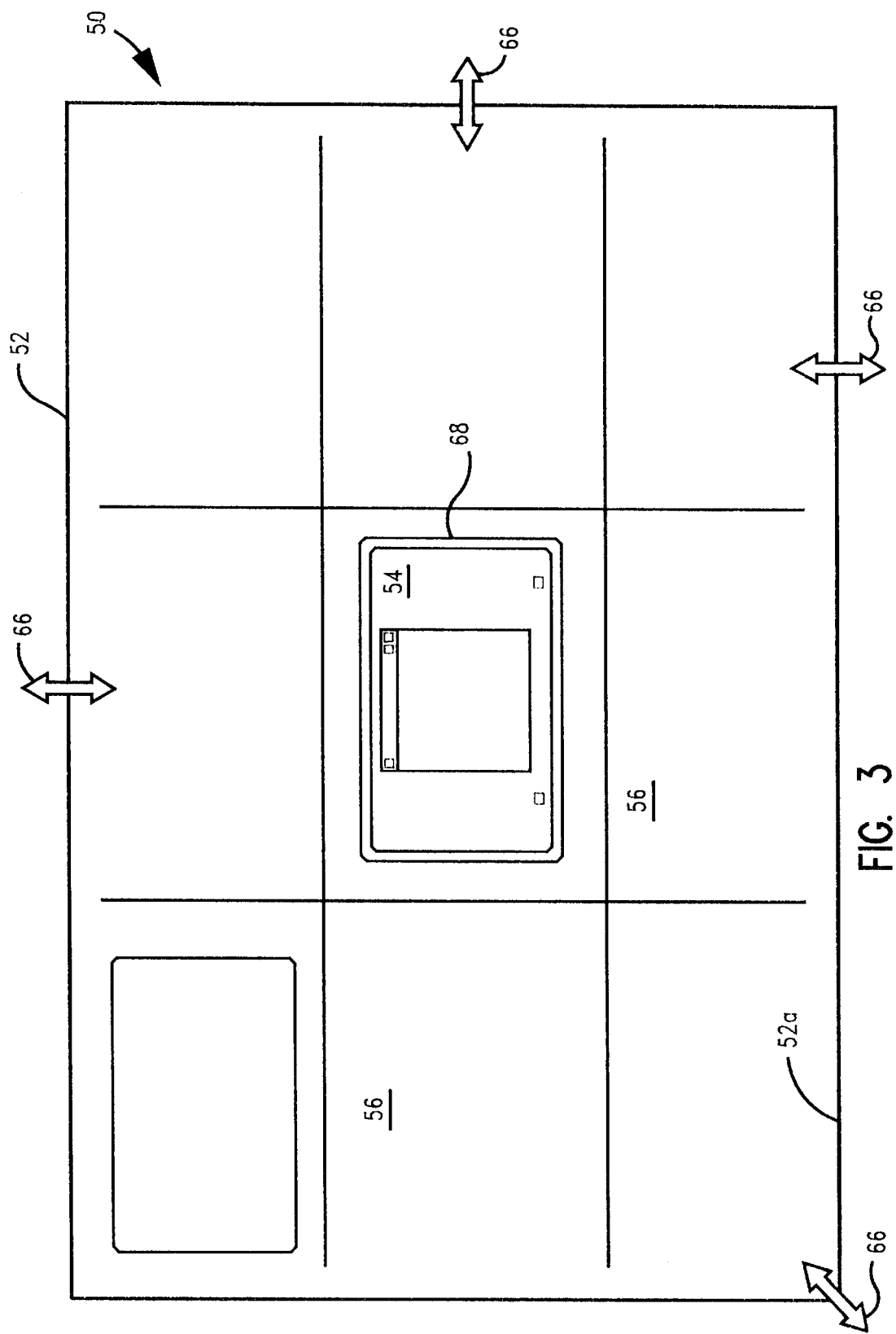
FIG. 3 is an exemplary view of a virtual display configured in a 3 by 3 array.

In FIG. 2 there is shown a Virtual Windows Desktop system 50 with a virtual display 52 and a physical display 54 positioned at the center of the virtual display 52. The physical display 54 is an area which is less than or equal to the size of the computer monitor or screen (not shown) which displays icons, application windows and application groups. The virtual display 52 is an area which is greater than or equal to the size of the physical display 54 wherein icons, application windows and application groups are arranged. The virtual display 52 can be configured to any size desired within the storage limitations of the computer system and can be a multiple of the physical display 54 or a variable size if preferred. An example of the virtual display 52 configuration is shown in FIG. 3 as an array of 3 by 3 which produces nine physical display portions 56.

The physical display 54 can be moved over the virtual display 52 in order to view the physical display portions 56. As shown in FIG. 3, placement of the physical display 54 over a portion of the virtual display 52 allows a user to view the particular area outlined by the physical display 54.

1. FUNCTIONS

A number of functions provide the user with the capability to manage the virtual display, the physical display and the applications window or Virtual Windows Desktop (VWD) generally. These functions are divided into groups of Virtual Display Functions, Physical Display Functions and Application Window Functions. In addition, three display object attributes apply to the functions of the virtual display 52, as well as to the functions of the physical display 54 and the VWD system 50. These attributes are an Anchored Object Attribute, a Floating Object Attribute and an Associated Object Attribute. A fourth attribute is the Display Priority Attribute which can be used in any of the function groups and is described below with the Virtual Display Functions.

Figure 4A:
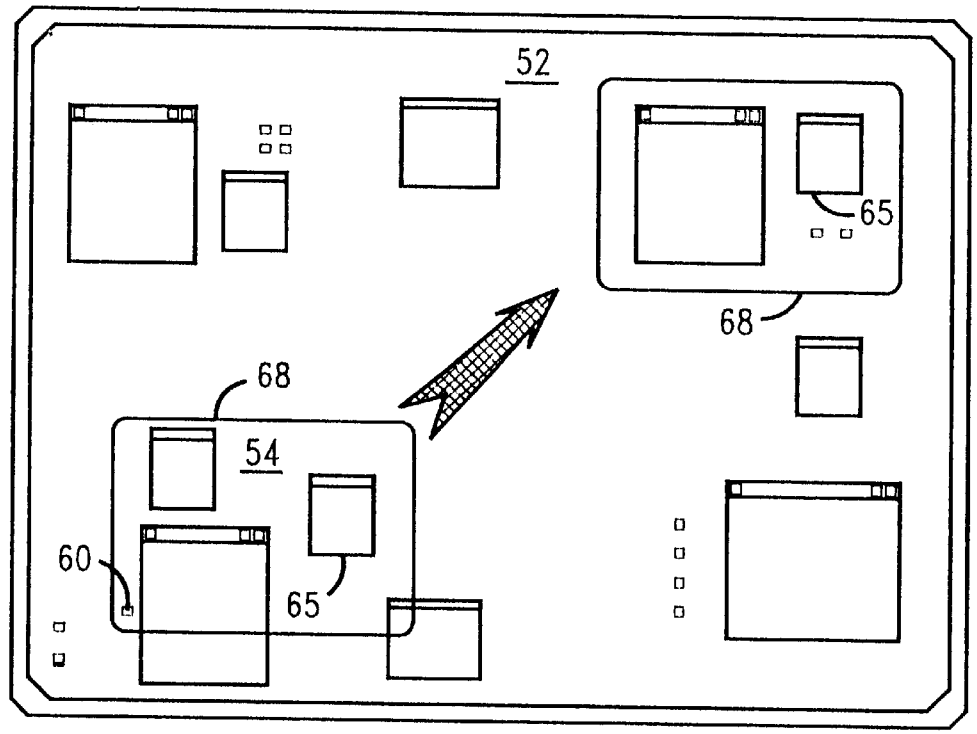
FIG. 4 illustrates the physical display movement over the virtual display (a) with the attached objects and (b) without the application objects.

FIG. 4a illustrates an anchored object 58 which is an application object tied to the physical display 54 and which moves with the physical display 54 wherever the physical display 54 is moved within the virtual display 52. The anchored object 58 cannot be moved outside the physical display 54, however, it may be copied if necessary. The anchored objects 58 will maintain the same relationship to the original physical display 54. Also, the anchored objects 58 could overlay or be hidden by application objects 64 in the target position depending on the Display Priority Attribute which assigns relative priorities to the application objects 64 for prioritizing viewing when a plurality of application objects occupy the same space on the virtual windows desktop.

Figure 4B:
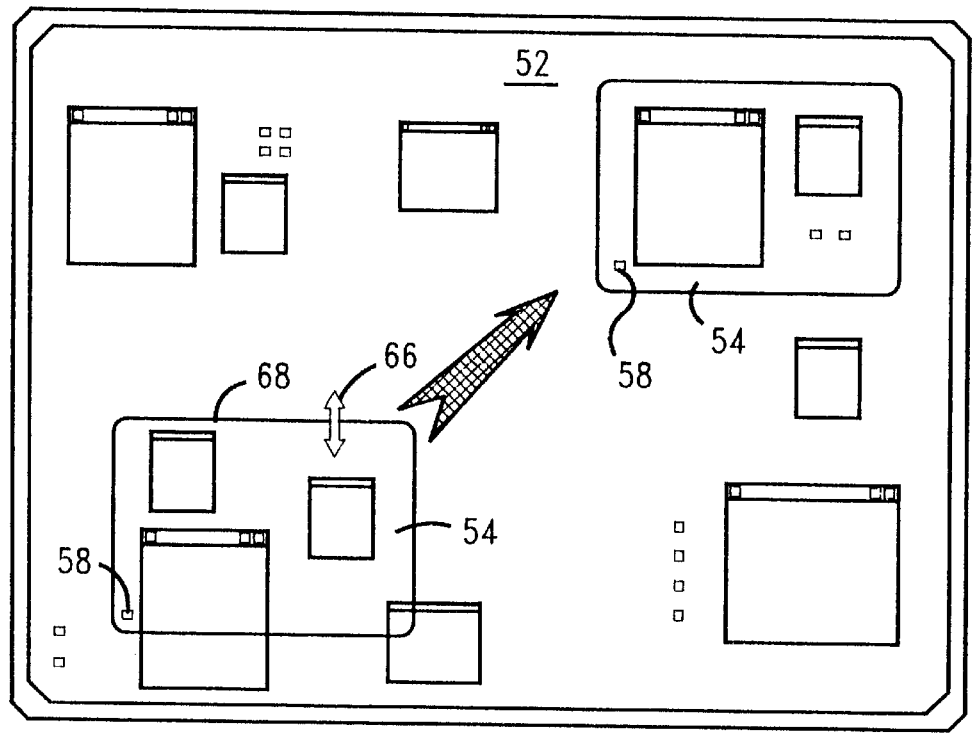

FIG. 4b illustrates a floating object 60 which is an application object which is detached from any application group window 65 and does not follow the physical display 54 when moved. Alternatively, the user can move the floating object 60 anywhere on the virtual display 52 or physical display 54 independently of the other application objects 64.

Figure 5:
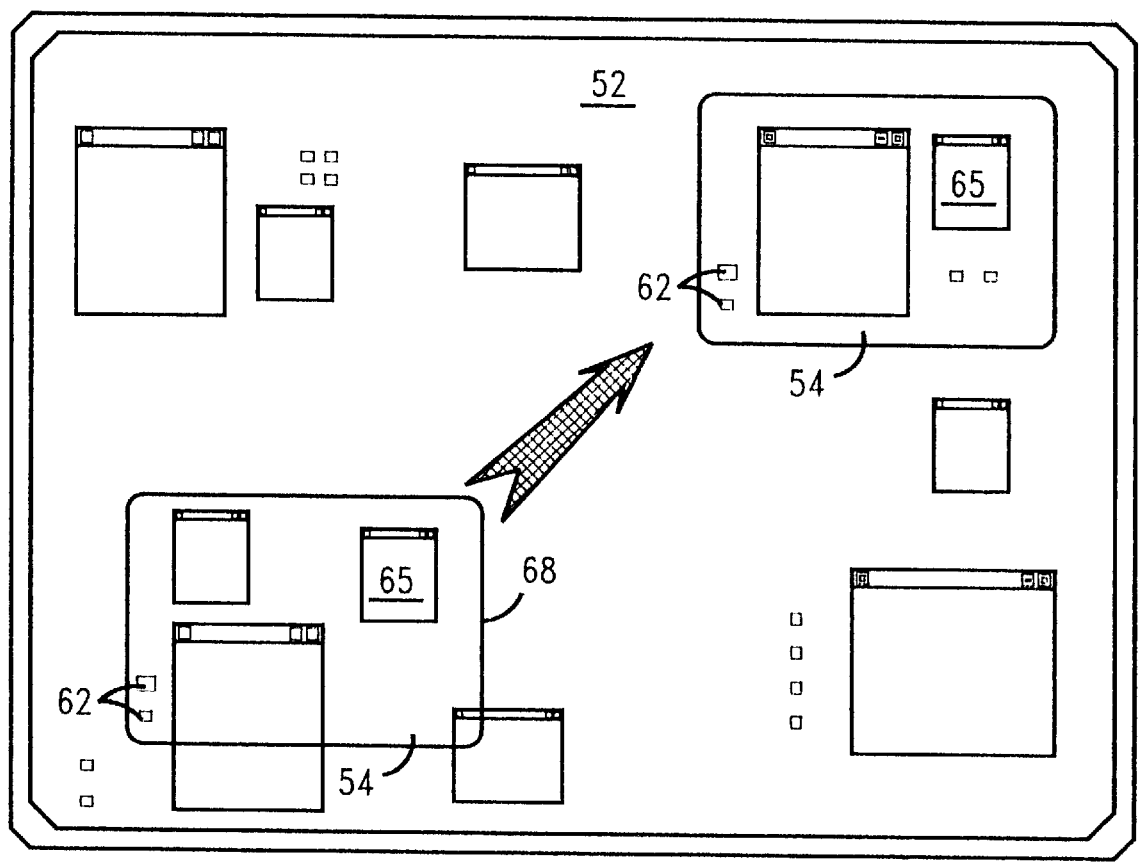
FIG. 5 illustrates the physical display movement over the virtual display with associated objects.

FIG. 5 illustrates associated objects 62 which are application objects that attache to a group of one or more other application objects. The property of the associated group of application objects is that it moves as a single application object or can be anchored to the physical display 54 or one or more physical display portions 56 which are illustrated in FIG. 3.

The following Virtual Display Functions provide the user with the capability to manage the virtual display 52. The Virtual Display Functions include: Define Virtual Area, Display Virtual Area, Move Physical Display Within Virtual Area, Move Display Objects Into and Out of the Physical Display, Lock Virtual Display, Restore Physical Display Window Dispersing and Restore to Physical. A description of each function follows.

Referring again to FIG. 3, a Define Virtual Area function allows the user to define the size of the initial display 52 and to expand or reduce the virtual display 52 size dynamically as shown by the bold arrows of FIG. 3. The dynamic sizing is accomplished by using a pointing device, such as a mouse (not shown), and pointing with a pointer 66 to an outline 52a, attaching the pointing device to the outline 52a, moving the outline 52a until the window is sized appropriately and releasing the pointing device. Alternatively, the dynamic sizing may be accomplished by menu commands requesting the input of array numbers representing multiple increments or decrements of the physical display 54 size. The increments or decrements of the physical display 54 represent the number of horizontal and vertical physical display portions 56 and need not be equal.

Figure 6:
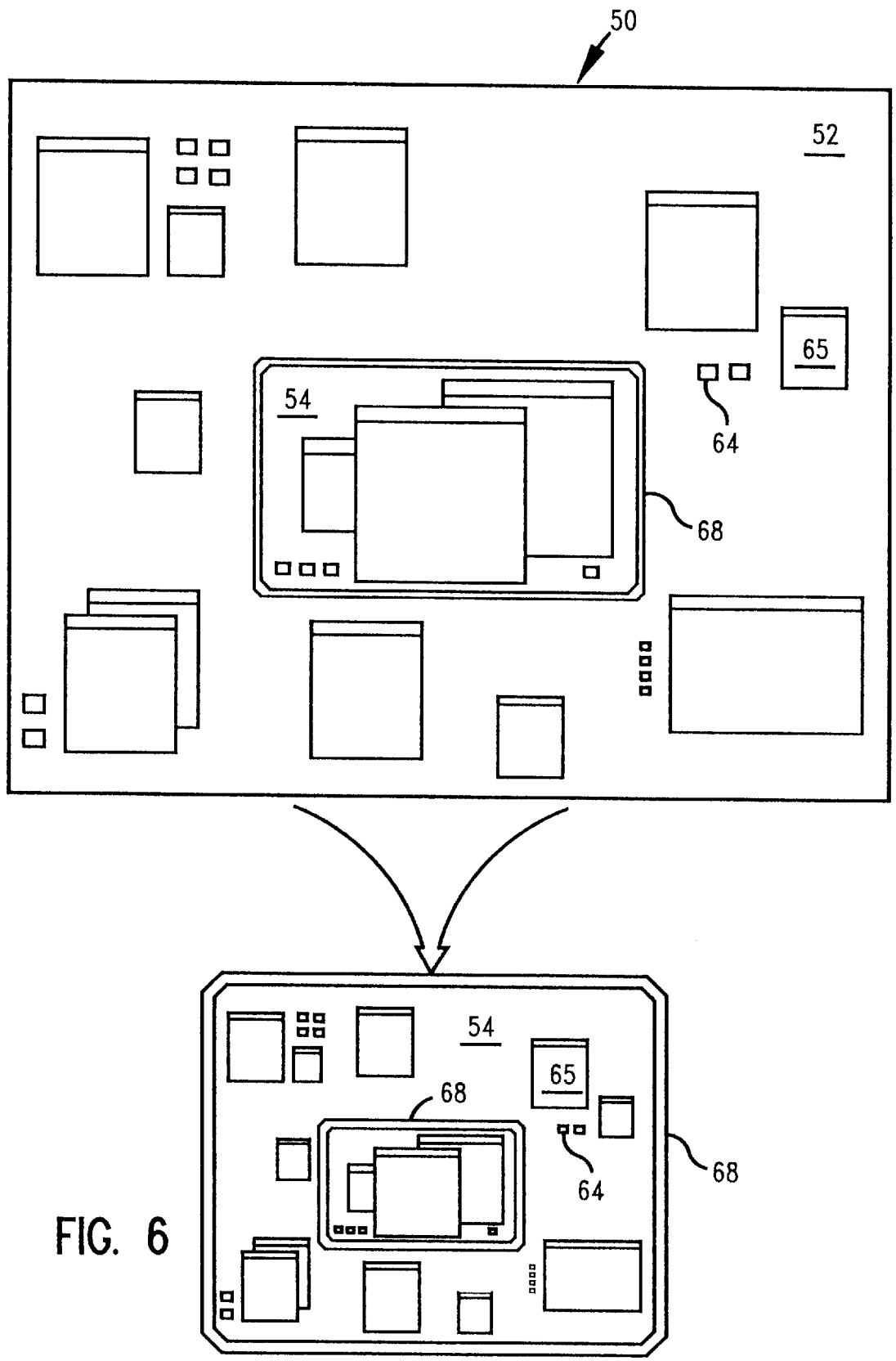
FIG. 6 is illustrates the Display Virtual Area function moving the entire virtual display into the physical display.
Figure 7:
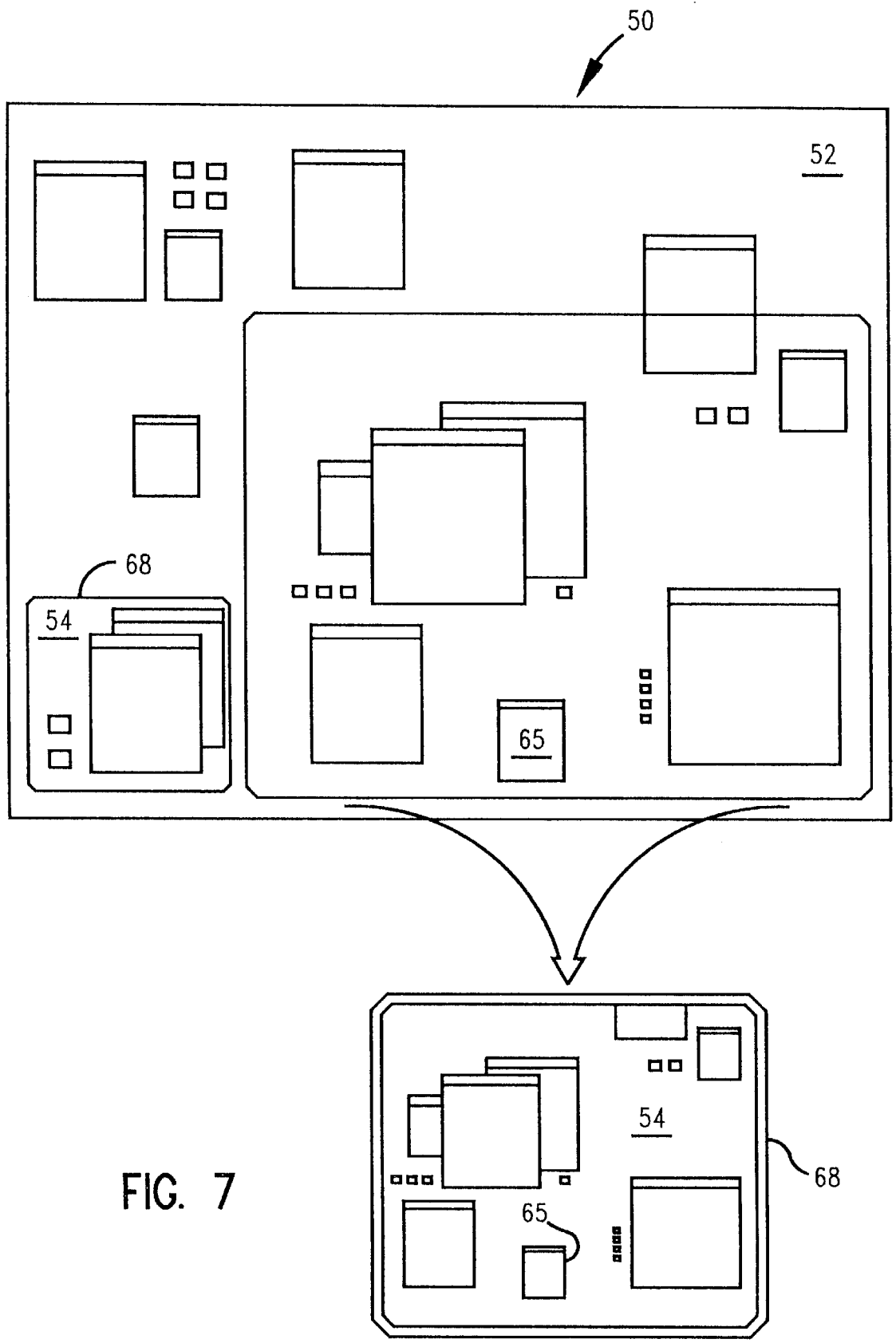
FIG. 7 illustrates the movement of a portion of the virtual display into the physical display.

A Display Virtual Area function illustrated in FIG. 6 displays the entire virtual display 52 in the physical display 54. The function visually reduces the entire virtual display 52, including all application group windows 65 and application objects 64. An outline 68 of the physical display 54 is also maintained on this display as a visual reference and to facilitate the functions described below. Since the entire virtual display 52 may consist of a large number of displayed application objects 64 an option is provided to display simplified application objects 64 in a reduced resolution application window to improve the display performance. The lower resolution is not a concern since this reduced virtual display 52 is for reconfiguration purposes rather than use in actual application interaction. A further option or subfunction is to allow for partial display of the virtual display 52 in the physical display 54 as shown in FIG. 7.

Figure 8:
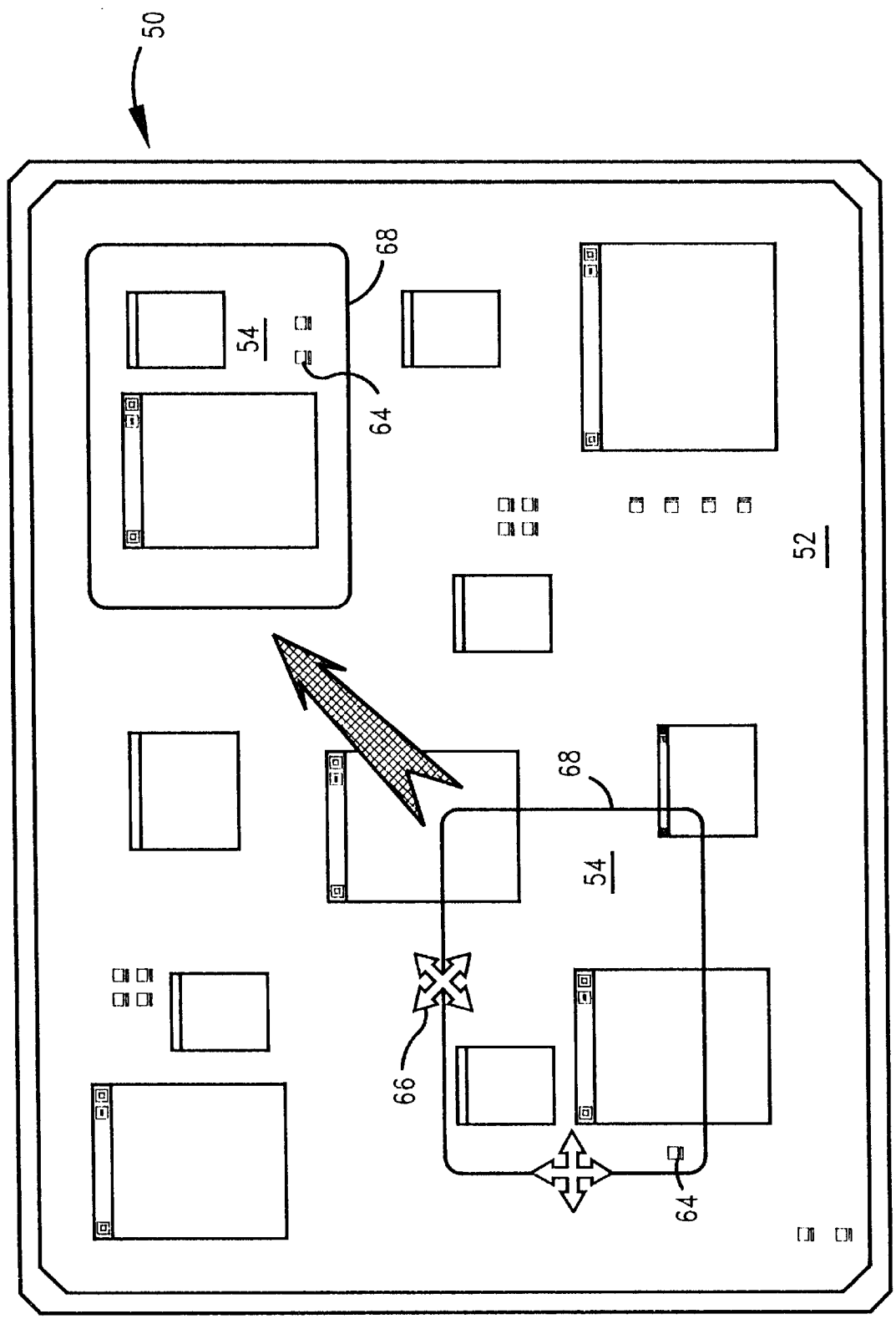
FIG. 8 illustrates the movement of the physical display within the virtual display.

A Move Physical Display Within Virtual Area function illustrated in FIG. 8 moves the physical display 54 anywhere within the virtual display 52 bounds. This is accomplished from either of two display modes. A first display mode is from the physical display 54 or normal application work environment and is described in the Physical Display Functions below. A second mode is from a reduced virtual display 52 environment described above. In the second mode a pointer 66 attached to the outline 68 of the physical display 54 and used to move the physical display 54 anywhere on the reduced virtual display 52. The pointer 66 is then released from the outline 68. An outline of all the application objects 64 is displayed inside the physical display 54 during the move.

Figure 9:
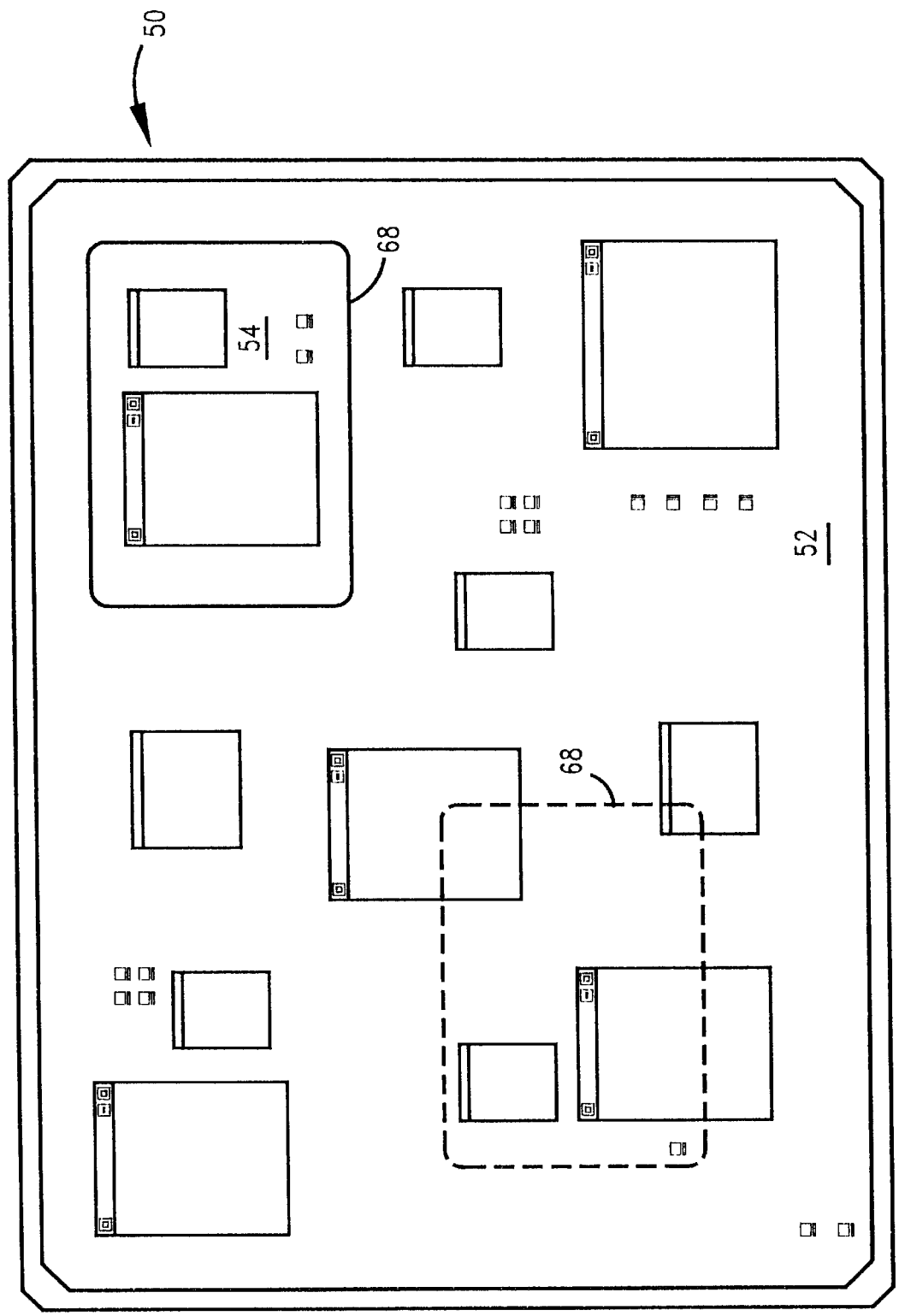
FIG. 9 illustrates the Move Physical Display Within Virtual Area function which leaves an outline of the display, shown with a dotted line, at the last location of the physical display on the virtual display.
Figure 10:
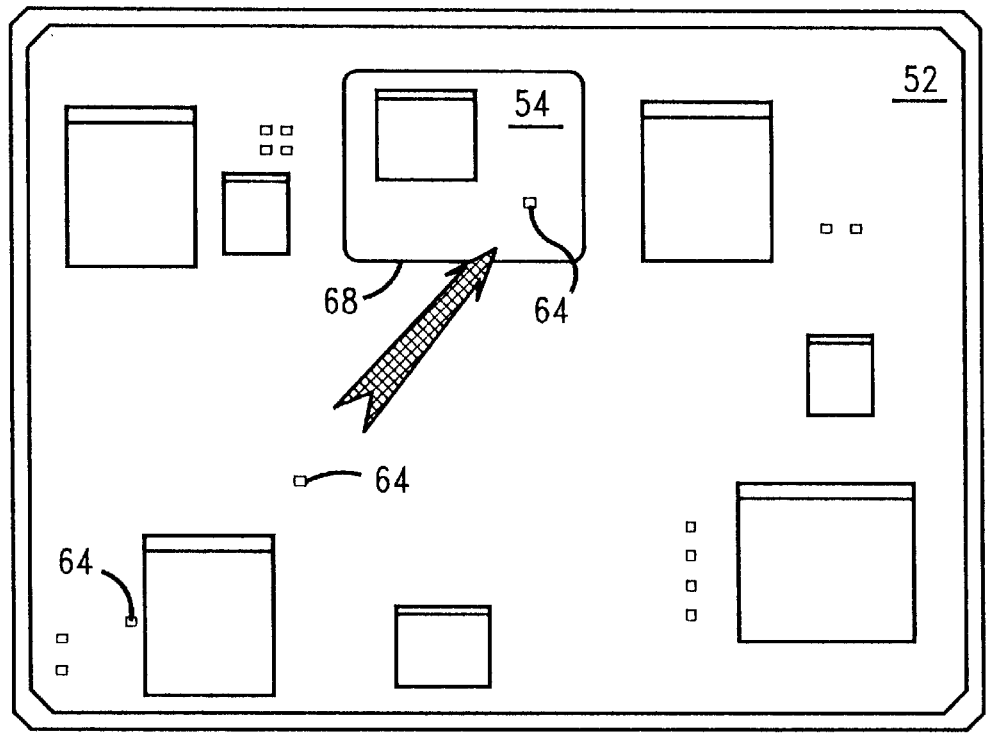
FIGS. 10A and 10B illustrate the virtual display with the application objects being moved (a) out of the physical display and (b) into the physical display.
Figure 10:
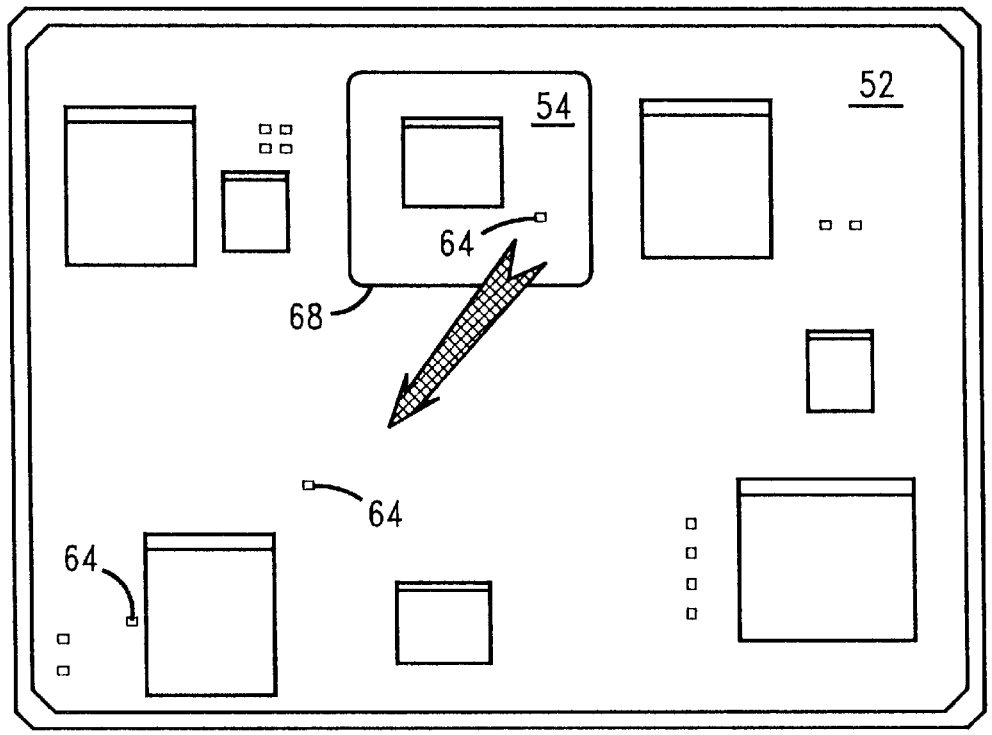

The Move Physical Display Within Virtual Area function illustrated in FIG. 9 leaves the outline 68, shown with a dotted line for illustration purposes, of the physical display 54 at the last location of the physical display 54 on the virtual display 52 which allows for easy movement between two physical display 54 locations on the virtual display 52. During movement, the contents of the beginning physical display continue to be displayed. This feature is similar to a Step to Previous or Next Display Position function and Auto Scan and Stop function described below.

A Move Display Objects Into and Out of the Physical Display function illustrated in FIGS. 10(a) and 10(b) also operate in the reduced virtual display 52 described above allowing the user to move displayed application objects 64 between the physical display 54 and virtual display 52 in either direction. FIG. 10(a) shows the application object 64 being removed from the physical display 54, while FIG. 10(b) shows the application object 64 being moved into the physical display 54. In addition, application objects 64 can also be moved anywhere around the virtual display 52.

Figure 11:
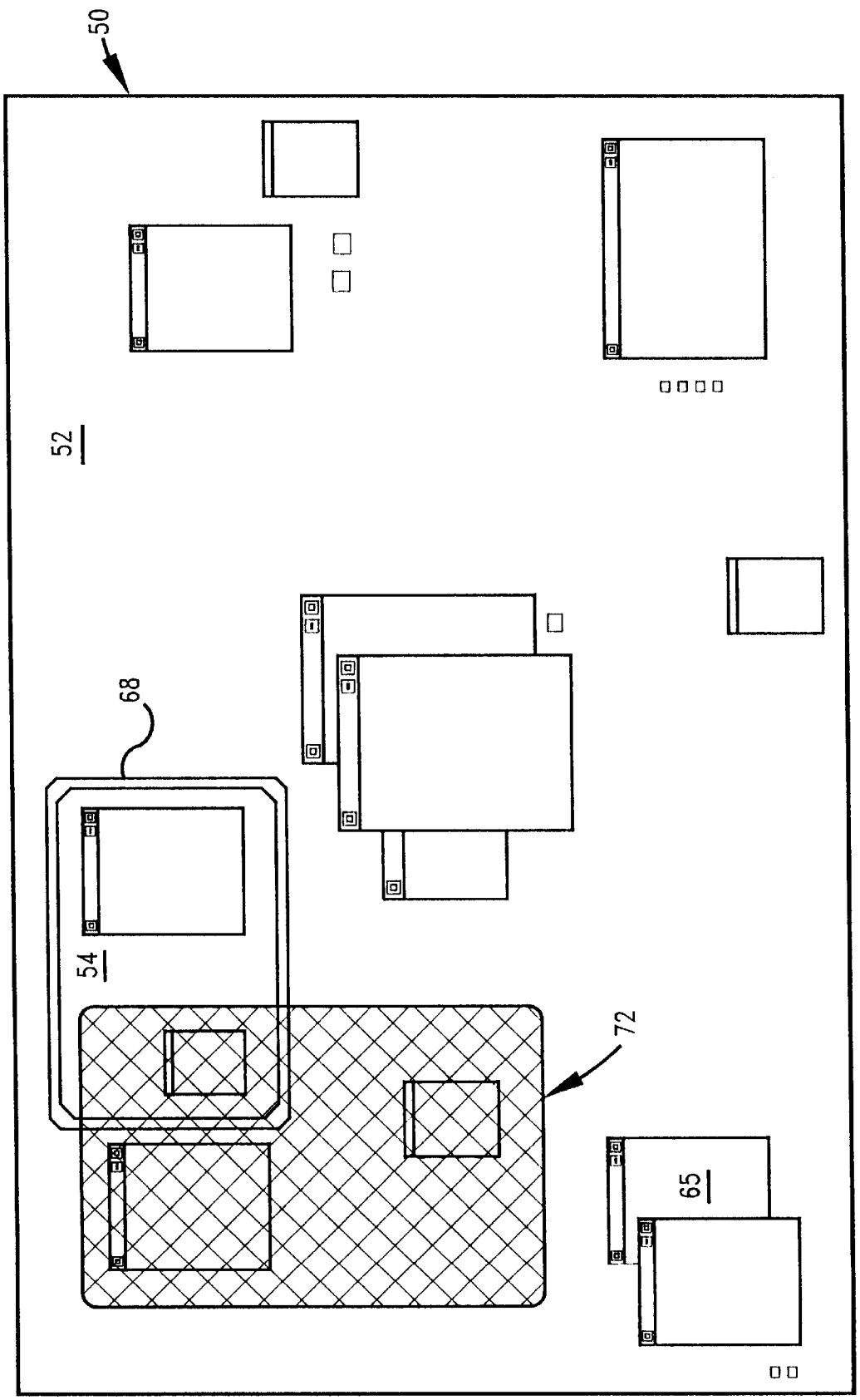
FIG. 11 illustrates the virtual display with a locked virtual area, shown shaded, in which the locked application objects are not displayed.

A Lock Virtual Display function illustrated in FIG. 11 allows portions of the virtual display 52 to be locked using a password in order to prevent unauthorized viewing of designated locked portions 72 of the virtual display 52. The locked portions 72 may be portions of the desktop equal in size to the physical display 54 or portions of greater or lesser size. When moving the physical display 54 over the locked portions 72 of the virtual display 52, the physical display 54 will pass over the locked portions 72 without displaying the contents of the locked portions 72, as illustrated by the shaded area in FIG. 11.

Figure 12:
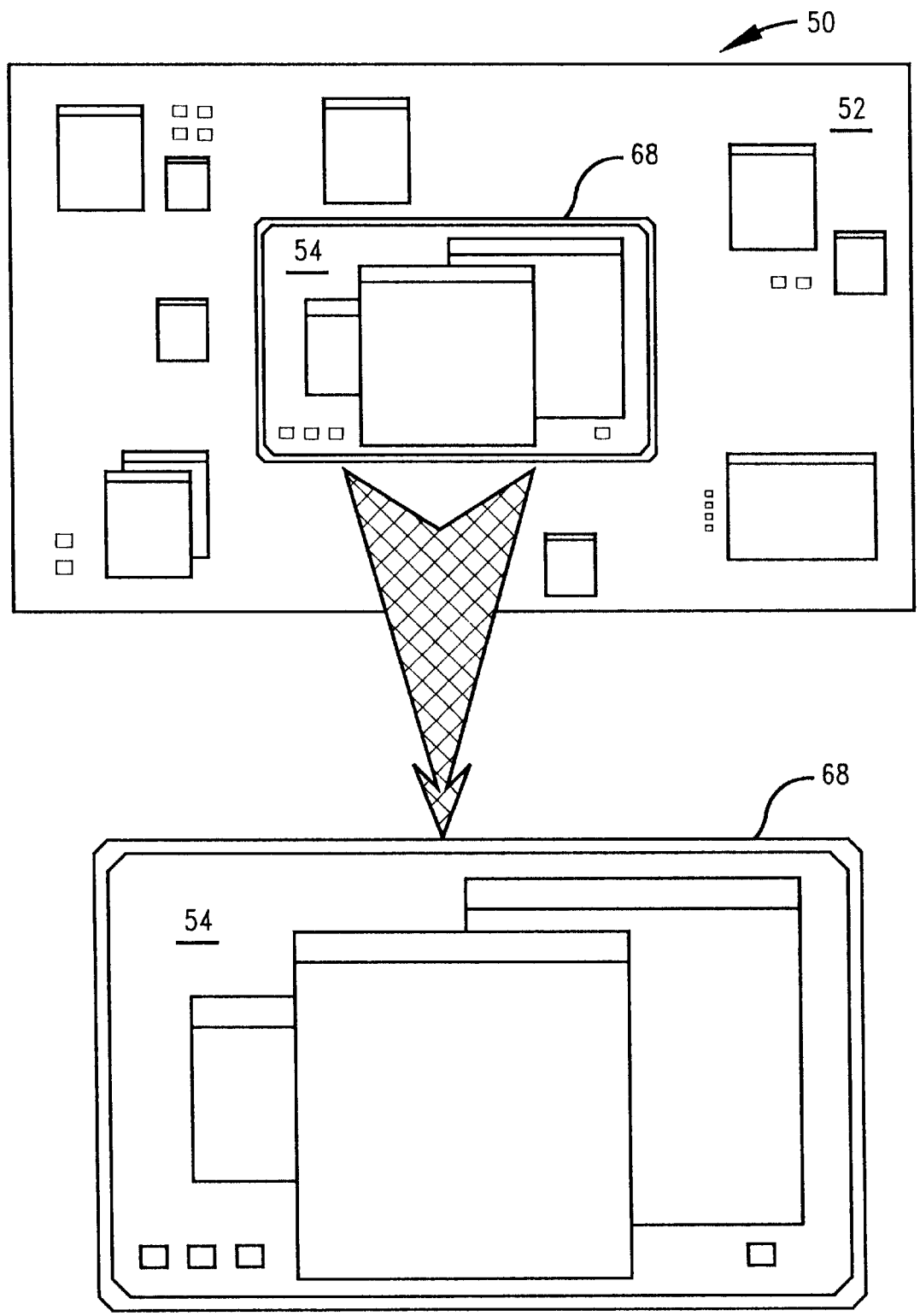
FIG. 12 illustrates restoration of the physical display to a size equal to the size of the screen and the resolution of the contents of the physical display.

A Restore Physical Display Window function illustrated in FIG. 12 allows the user to return to the normal physical display 54 by increasing the size of the physical display 54 to a size equal to the screen (not shown) and resolves the contents of the physical display 54. This function complements the Display Virtual Area function.

Figure 15:
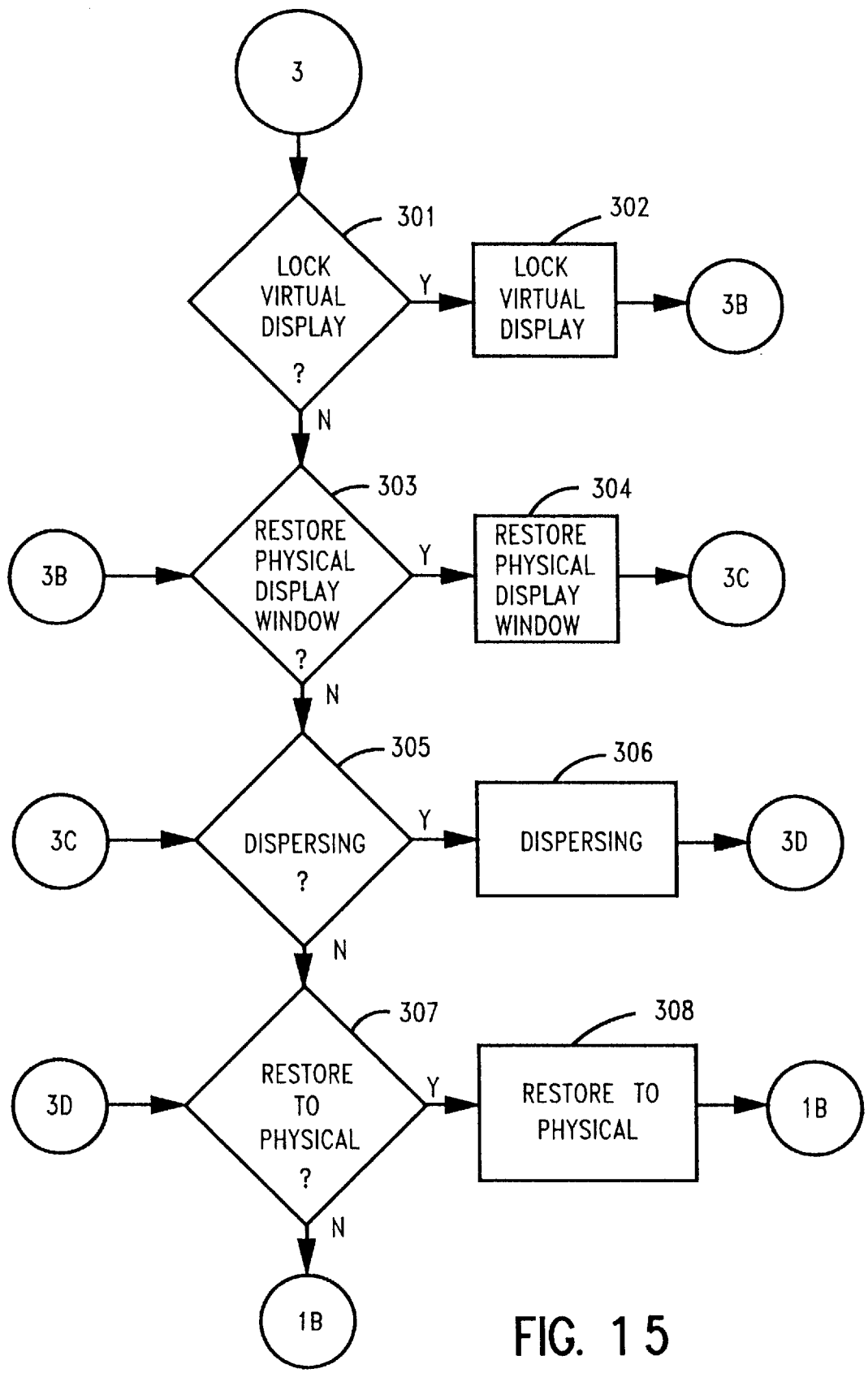

A Dispersing function (although not illustrated separately, this function is represented as Steps 305 and 306 of FIG. 15) allows for the normal physical display 54 to disperse into the virtual display 52. That is, all of the application group windows 65 in the normal physical display 54 are unlayered into the virtual display 52 so that no application group window 65 is obscuring the view of another group window 65.

A Restore to Physical function (although not illustrated separately, this function is represented as Steps 307 and 308 of FIG. 15) allows for the application group windows 65 that have been dispersed by the dispersing function to be restored to the physical display 54. This feature will also place any new application group windows 65 that were created after using the dispersal function to be placed in the physical display 54.

A number of Physical Display Functions provide the user with the capability to manage the physical display 54 and the application objects 64 within it. Some of the Physical Display Functions have a similar function to the ones described in the virtual display mode, but are performed directly from the physical display 54 environment. The Physical Display Functions include: Move Physical Display, Rapid Physical Display Movement, Discreet Physical Display Movement, Save Physical Display Position, Delete Physical Display Position, Step to Previous or Next Physical Display Position, Auto Scan and Stop, and Associated Window Groups. These functions are described below.

A Move Physical Display function, which functions similarly to the function illustrated in FIG. 8, allows the user to move the physical display 54 anywhere on the virtual display 52 without switching to the reduced display environment. This is achieved by moving the outline 68 of the physical display 54 in the direction of desired movement. The pointer 66 or a function key (not shown) is employed to continuously or discretely execute the move increment. Eight directions of movement including up, down, left, right, and all four diagonals are possible. Movement is achieved either rapidly or in discreet steps described by the following two functions.

Figure 16:
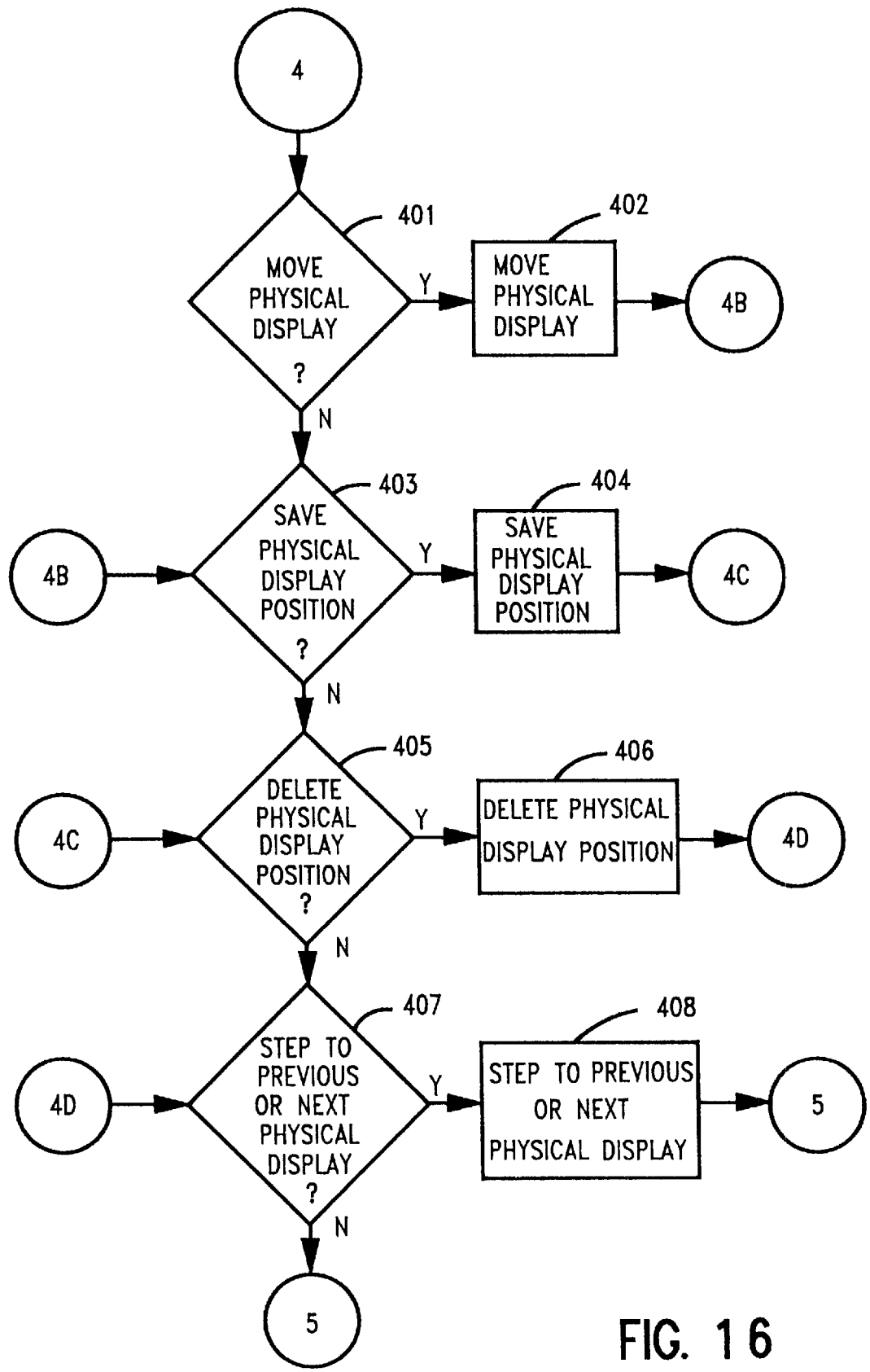

A Rapid Physical Display Movement function (although not illustrated separately, this function is represented generally by the Move Physical Display function Steps 401 and 402 of FIG. 16) is accomplished by setting the pointer 66 of a pointing device, such as a mouse, in the physical display 54 and when the pointer 66 is moved the contents will appear in the physical display 54. The speed of the pointer control movement directly affects the speed of the virtual display 52 movement through the physical display 54. Small incremental movements of the pointing device translate to large movements of the physical display 54. Upon each movement, the physical display advances to the next whole physical display portions 56 of the virtual display.

A Discreet Physical Display Movement function (although not illustrated separately, this function is represented generally by the Move Physical Display function Steps 401 and 402 of FIG. 16 ) is accomplished by using horizontal and vertical arrow keys to move the physical display 54 in discreet movements equal to the size of the physical display 54 across the virtual display 52. This same movement can be accomplished by using the pointer 66 on a physical display outline 68 which contains horizontal and vertical arrows similar to the horizontal and vertical arrow pointer 66 of FIG. 8.

A Save Physical Display Position function (although not illustrated separately, this function is represented as Steps 403 and 404 of FIG. 16) saves the position of a desired active physical display 54 in a stack memory structure (not shown). The stack memory is a data structure which stores information in a last-in-first-out configuration and is configured in a ring such that the user can easily cycle sequentially through all the saved display positions in a forward or backward direction.

A Delete Physical Display Position function (although not illustrated separately, this function is represented as Steps 405 and 406 of FIG. 16) complements the save function described above by facilitating the removal of one or more of the saved physical display 54 positions from the stack. A further subfunction would be to clear the whole stack which deletes all the saved physical display 54 positions.

A Step to Previous or Next Physical Display Position function (although not illustrated separately, this function is represented as Steps 407 and 408 of FIG. 16) allows the user to display or restore the next or previously saved position from the stack. This function is used to easily move between two or more physical display 54 positions without reverting to the reduced virtual display 52 environment.

Figure 17:
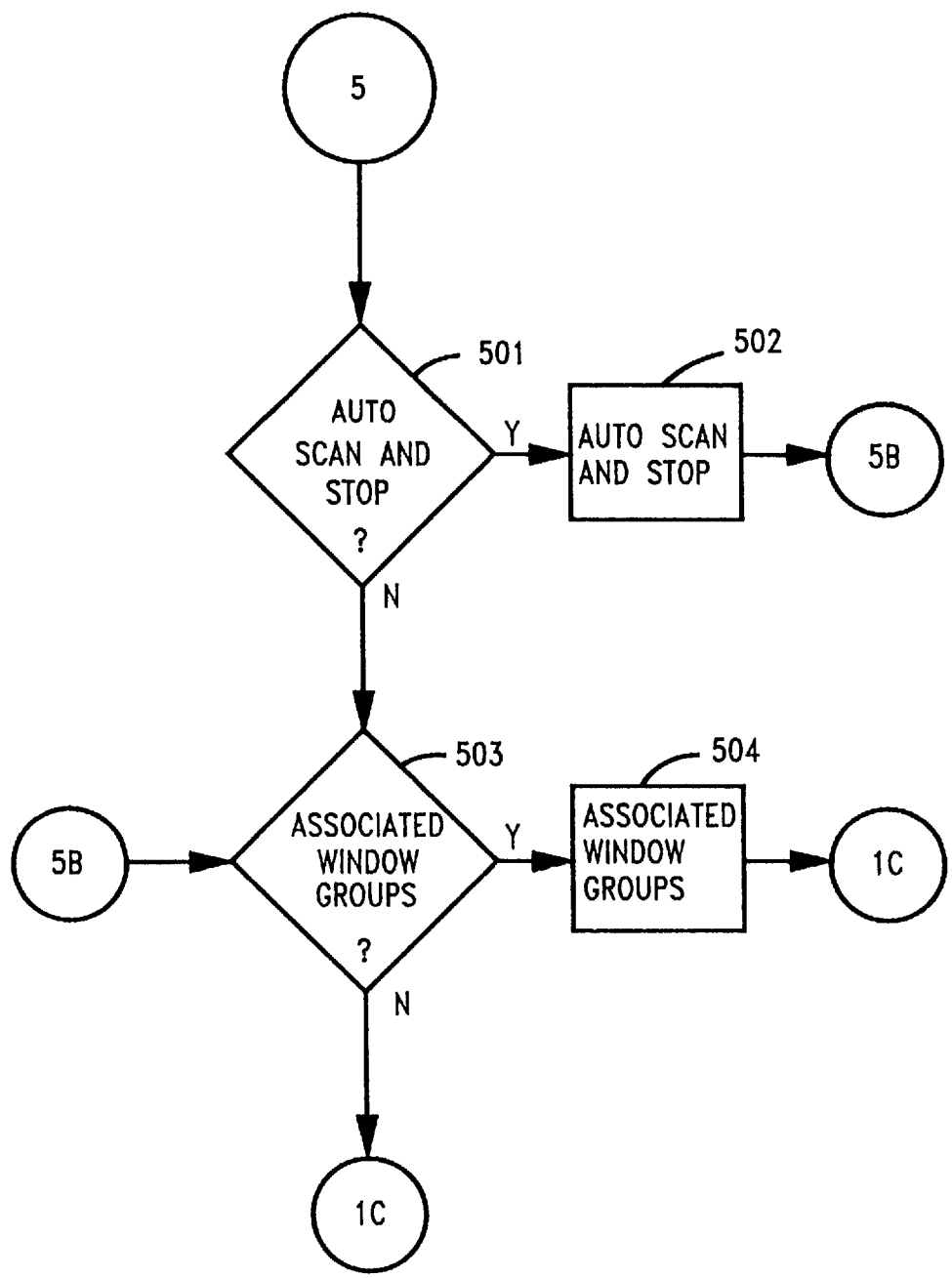

An Auto Scan and Stop function (although not illustrated separately, this function is represented as Steps 501 and 502 of FIG. 17) allows continuous sequential cycling through all of the saved physical display 54 positions in the stack. The cycling rate is variable and can be configured for comfortable viewing. Additionally, the user may stop at any active application during the Auto Scan and Stop cycle.

An Associated Window Groups function, which functions similarly to the function illustrated in FIG. 5, groups application windows together so that associated application group windows 65 are treated as one. For example, all application group windows 65 within a group are moved in and out of the physical display 54. The user can form many associated application window groups 65 for one or more applications. Each group can also be assigned attributes as described above. The grouping can be handled by both the Virtual and Physical Display Functions. A complement subfunction allows for disjoining of an application group window 65 from a group and to disjoint the whole group.

Figure 13:
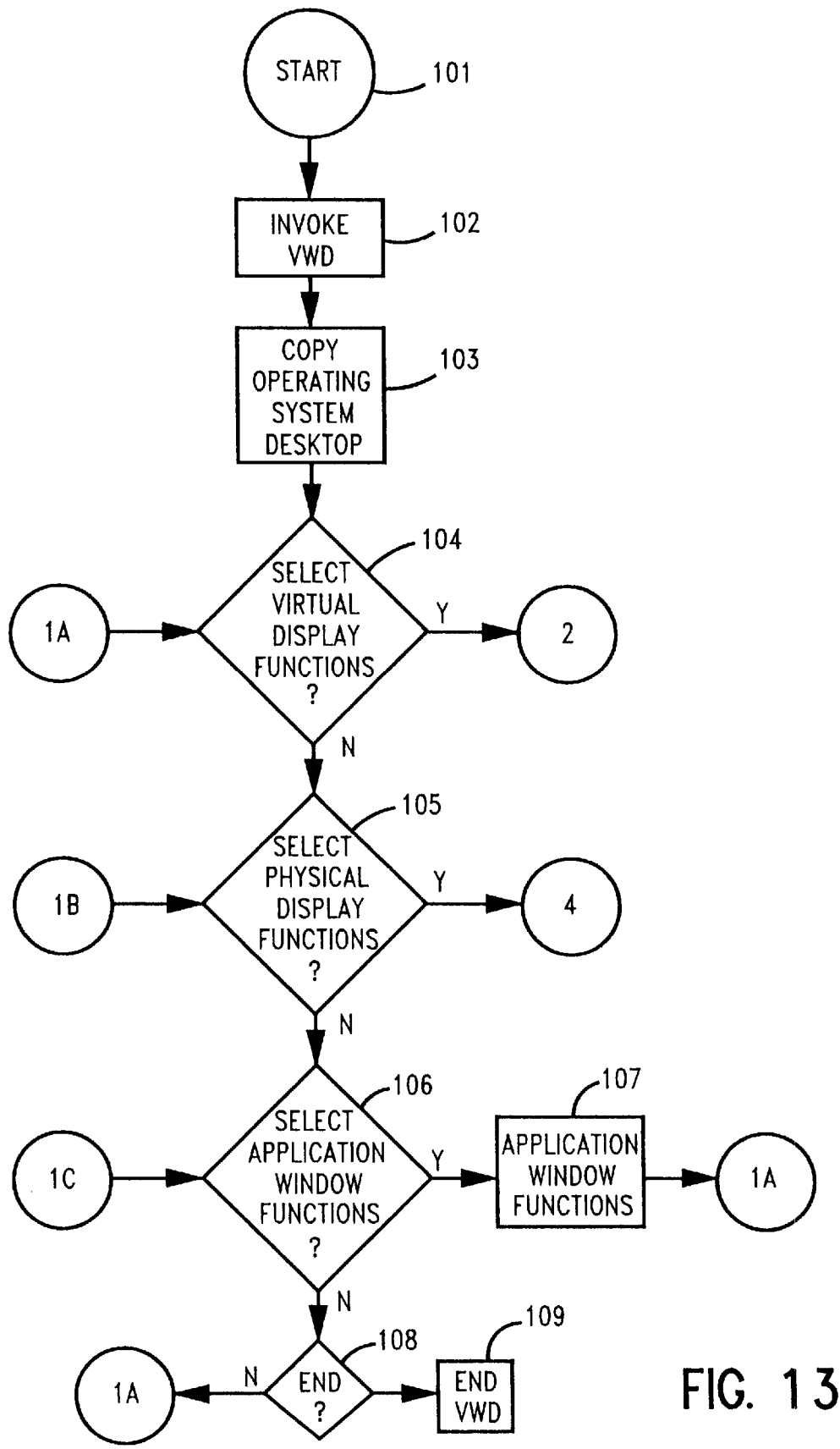
FIGS. 13–17 illustrate a flow chart representing steps 101 through 504 of the operation process of the Virtual Windows Desktop system.
Figure 14:
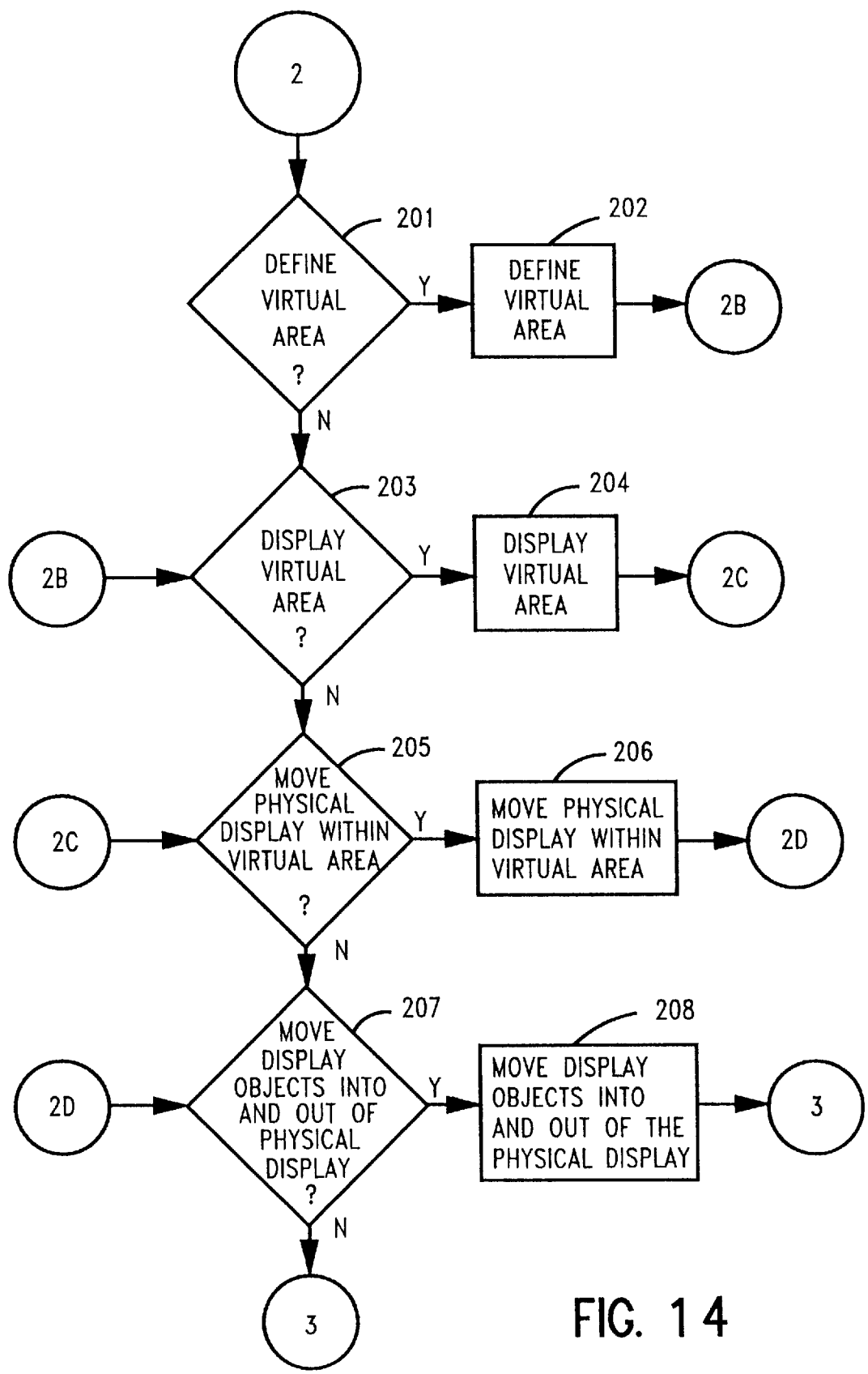

Application Window Functions (although not illustrated separately, these functions are represented as Steps 106 and 107 of FIG. 13) are the same as those provided by the window management operating system. These functions are independent of the functions described above and are not effected by them. The basic functions consist of sizing application windows such as minimizing, maximizing, and full screen display. Others include moving, copying, opening, and closing application windows. These functions form an integral part of the VWD system 50.

2. PROCESSES

A flow chart illustrated in FIGS. 13–17 details the operation of the Virtual Windows Desktop (VWD) system 50 in steps 101 through 504. The object numbers assigned to previous figures are carried through for consistency. FIG. 13 begins the operation on step 101. The remaining steps operate as explained below and include references to various programs which can be written by one of ordinary skill in the art without undue experimentation in accordance with the description provided.

The VWD system 50 program is executed in step 102. This step allows the VWD to operate in a plurality of operating systems and operate application programs therein. The key to this process is that once the VWD is executed, it continues to execute and remains in control intercepting all functions that would normally be passed to the operating system. This is accomplished by the VWD reading all functions that are passed to the operating system and separating functions that are used by the VWD to manipulate the Virtual Display Functions and the Physical Display Functions. Functions which the VWD does not process are passed to the operating system for execution. Functions which the VWD does process are executed by the VWD.

Step 103 copies the operating system display screen or operating system desktop (not shown) by the following process: a program STORE_OSD (not shown) is used to create a matrix or data file PA (not shown) and to store the position of the objects that are visible on the desktop presented by the operating system. The STORE_OSD program also stores the memory addresses to the object names, memory addresses to the object execution programs, and memory addresses to any other information needed by the operating system to execute the object when it is selected with a mouse.

Step 104 allows the user to select the Virtual Display Functions that provide the user with the capability to manage the virtual display 52.

Step 105 allows the user to select the Physical Display Functions that provide the capability to manage the physical display 54 and its objects.

Steps 106 and 107 allow the user to chose the Application Window Functions which select an application and pass it to the operating system for execution. Steps 108 and 109 allow the user to end or exit the VWD system 50.

Steps 201 and 202 perform the Define Virtual Area function as follows: a program DEF_VA (not shown) allows the user to define the virtual display 52 and to expand or reduce the virtual display 52 size dynamically. A data file VA is created which stores the size of the virtual display 52 in multiples of the physical display 54 or in a variable size. A PLACE_OSD program (not shown) is used to read a PA data file (not shown) and to store the previously stored operating system desktop in the VA data file. The VA data file stores the memory addresses to the object names, memory addresses to the object execution programs, memory addresses to the icons and memory addresses to the object directories and memory addresses to any other information needed that will reside in the virtual display.

Steps 202 and 203 perform the Display Virtual Area function by displaying the entire virtual display 52 in a reduced form by a program DISP_RE (not shown) which gets the reduced virtual display 52 from a data file VAREDUCE (not shown). Prior to the DISP_RE program displaying the virtual display 52 in reduced form, the entire virtual display 52 must have first been reduced by a program REDUCTION (not shown) which takes the information from the VA data file and reduced the whole virtual display 52 into the physical display 54 including all of the windows, icons and other objects and stores the information in the VAREDUCE data file at a reduced resolution. Optionally, the user can display a reduced portion of the virtual area into the physical display 54 by invoking the DISP_PART program (not shown) which gets information from the VAREDUCE data file.

Steps 205 and 206 perform the Move Physical Display Within Virtual Area function by moving the physical display 54 anywhere in the virtual display 52 in reduced mode. A mouse can move the reduced display by invoking a programMOVE_REDUCE (not shown) which changes the position variables in the VAREDUCE data file according to the movement of the mouse. The MOVE_REDUCE program also allows attaching attributes such as icons or windows to the physical display 54 so that they appear in the new position of the physical display 54 and leaves the outline 68 of the last moved physical display 54 in the VAREDUCE data file so that it is visible in the reduced virtual area. The MOVE_REDUCE program will also keep track of the display priority so that the attached objects can overlay or be hidden by the objects in the target position of the physical display 54.

Steps 207 and 208 perform the Move Display Objects Into and Out of the Physical Display function. This operation occurs in the reduced virtual display 52 environment and allows users to move displayed windows, icons or other objects between the physical and virtual displays in either direction. To move the objects, the VAREDUCE data file and a MOVE_OBJ program (not shown) are executed.

Steps 301 and 302 perform the Lock Virtual Display function by locking the virtual display 52 or a portion of the virtual display 52 using the VA data file with a LOCK_R program (not shown) to store the locked portions 72 of the virtual display 52 which appear to be blank when viewed and are illustrated as a shaded area in FIG. 11. The locked portions 72 may be unlocked by supplying the LOCK_R program password.

Steps 303 and 304 perform the Restore Physical Display Window function using the RESTORE program in conjunction with the VAREDUCE data file and the VA data file to restore the reduced physical display 54 to normal size.

Steps 305 and 306 perform the Dispersing function which disperses the application windows by the following operation: a STORE_PHYSICAL program (not shown) and an SP data file (not shown) are used to store the contents of the physical display 54 and a DISPERSE program (not shown) is used with the VA data file to disperse all of the overlapping application windows to the virtual display 52.

Steps 307 and 308 perform the Restore to Physical function by use of a RESTORE_P program (not shown) with an SP data file. This also restores prior application windows to their previous positions.

Steps 401 and 402 execute the Move Physical Display function which can be performed either rapidly or discreetly. A Rapid Physical Display Movement function is performed by the following: a RAPID_M program (not shown) is used with the VA data file to move sections of the virtual display 52 into the physical display 54; the mouse is used on the physical display 54 and thereby moving the physical display 54 across the virtual display 52; the physical display 54 then contains the new data from the virtual display 52. Further, A Discreet Physical Display Movement function moves the physical display 54 in discreet movements. A DISCREET program (not shown) is used with the VA data file to move the physical display in discreet movements across the virtual display 52 with the up, down, left and right arrow keys. The physical display 54 then contains the new data from the virtual display 52.

Steps 403 and 404 execute the Save Physical Display Position function by using a STACK_P program (not shown) with a SAVE_P data file (not shown) to save the active physical display 54 with previous saved physical display(s) so that the user can later return to any of the saved physical display(s).

Steps 405 and 406 execute the Delete Physical Display Position function by using a DELETE_P program (not shown) with the SAVE_P data file to delete previously saved physical display(s) that were saved with the STACK_P program.

Steps 407 and 408 execute the Step to Previous or Next Physical Display function by using a STEP_TO (not shown) program with the SAVE_P data file to select a previously saved physical display 54.

Steps 501 and 502 execute the Autoscan and Stop function. An AUTOSCAN program (not shown) is used with the SAVE_P data file to cycle through all of the physical display 54 positions. The AUTOSCAN program can set a range of cycling rates and can be controlled by a mouse to stop on a previously saved physical display 54 position.

Steps 503 and 504 execute the Associated Window Groups function. An ASSOCIATE program (not shown) and the VA and VAREDUCE data file are used on application group windows 65 to group them and treat them as one. All windows may be moved into or out of a physical display 54.

Thus the present invention provides an improved GUI operating system for PCs and workstations in wide use today it relieves the user of the tedious and wasteful task of window management.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for visually organizing multiple computer application objects on a computer screen, said objects being adapted to execute a computer program with a graphical user interface comprising the steps of:
   a) providing a virtual display, said virtual display adapted to display application objects arranged thereon, said virtual display having a single, continuous virtual area larger than the screen when said application objects are resolvable on the screen and configurable to any desired size;
   b) providing a physical display adapted to be displayed on the screen or a portion thereof for displaying said application objects, said physical display being smaller than said virtual display;
   c) moving said physical display in a single, continuous movement to locate said physical display at a position corresponding to at least one of said application objects on said virtual display;
   d) viewing said at least one of said application objects through said physical display;
   e) moving said physical display in discreet movements equal to the size of the physical display to locate said physical display at a position corresponding to another one of said application objects on said virtual display;
   f) viewing said another one of said application objects through said physical display;
   g) grouping a plurality of said application objects encompassing an area of said virtual display independent of the size of said physical display, together for viewing and moving as a group, and
   h) moving the group of application objects on said virtual display with said physical display, and viewing said group through said physical display.

2. A process for visually organizing multiple computer application objects on a computer screen, said objects adapted to execute a computer program with a graphical user interface comprising the steps of:
   a) providing a virtual display, said virtual display adapted to display application objects arranged thereon, said virtual display having a virtual area larger than the screen when said application objects are resolvable on the screen;
   b) providing a physical display adapted to be displayed on the screen or a portion thereof for displaying said application objects;
   c) locating said physical display at a position corresponding to at least one of said application objects on said virtual display;
   d) viewing said application object through said physical display;
   e) coupling said application object to said physical display; and
   f) moving said physical display to effect simultaneous movement of said application object.

3. A process for visually organizing multiple computer application objects on a computer screen, said objects adapted to execute a computer program with a graphical user interface comprising the steps of:
   a) providing a virtual display, said virtual display adapted to display application objects arranged thereon, said virtual display having a virtual area larger than the screen when said application objects are resolvable on the screen;
   b) providing a physical display adapted to be displayed on the screen or a portion thereof for displaying said application objects;
   c) locating said physical display at a position corresponding to at least one of said application objects on said virtual display;
   d) viewing said application object through said physical display;
   e) locking said virtual display or a portion thereof with a password; and
   f) moving said physical display over the locked portion of said virtual display without viewing the contents of said virtual display.

4. A process for visually organizing multiple computer application objects as claimed in claim 3 and further comprising the step of unlocking said locked portion of said virtual display with a password.

5. A process for visually organizing multiple computer application objects on a computer screen, said objects adapted to execute a computer program with a graphical user interface comprising the steps of:
   a) providing a virtual display, said virtual display adapted to display application objects arranged thereon, said virtual display having a virtual area larger than the screen when said application objects are resolvable on the screen;
   b) providing a physical display adapted to be displayed on the screen or a portion thereof for displaying said application objects;
   c) locating said physical display at a position corresponding to at least one of said application objects on said virtual display;
   d) viewing said application object through said physical display; and
   e) associating a plurality of said application objects to form a group for viewing through said physical display and moving with said physical display as a group on said virtual display.

* * * * *